United States Patent
Gotoh

(10) Patent No.: US 9,417,937 B2
(45) Date of Patent: Aug. 16, 2016

(54) TERMINAL DEVICE AND DATA PASSING METHOD

(71) Applicant: Hiroshi Gotoh, Kanagawa (JP)

(72) Inventor: Hiroshi Gotoh, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/602,720

(22) Filed: Jan. 22, 2015

(65) Prior Publication Data

US 2015/0242257 A1    Aug. 27, 2015

(30) Foreign Application Priority Data

Feb. 24, 2014    (JP) .................................. 2014-032497

(51) Int. Cl.

| G06F 3/00 | (2006.01) |
|---|---|
| G06F 9/44 | (2006.01) |
| G06F 9/46 | (2006.01) |
| G06F 13/00 | (2006.01) |
| G06F 9/54 | (2006.01) |

(52) U.S. Cl.
CPC ...................................... *G06F 9/546* (2013.01)

(58) Field of Classification Search
None
See application file for complete search history.

(56) References Cited

U.S. PATENT DOCUMENTS 6,357,006 B1 *    3/2002    Pham ................... G06F 21/606
                                                          380/282

FOREIGN PATENT DOCUMENTS

JP    2001-067236    3/2001

* cited by examiner

*Primary Examiner* — Craig Dorais
(74) *Attorney, Agent, or Firm* — Oblon, McClelland, Maier & Neustadt, L.L.P.

(57) ABSTRACT

A terminal device passes data between programs. The terminal device includes a data passing unit configured to receive the data from a first program and pass the received data to a second program selected from among one or more second programs associated with a type of the received data; the first program configured to convert the type of the data, which is a passing target, from an original type into a unique type, and then pass the data to the data passing unit; and the second program configured to convert the type of the data received from the data passing unit into the original type from the unique type, the second program being associated with the unique type.

20 Claims, 14 Drawing Sheets

| APPLICATION NAME | PROCESSABLE EXTENSION |
|---|---|
| APPLICATION A | doc, jpg, pdf |
| APPLICATION B | ric_abc |
| APPLICATION C | doc, pdf |
| ⋮ | ⋮ |

TERMINAL DEVICE AND DATA PASSING METHOD

BACKGROUND OF THE INVENTION

1. Field of the Invention

The present invention relates to a terminal device and a data passing method.

2. Description of the Related Art

Conventionally, there is known a data passing method, in which the load of applications can be reduced when passing data between a plurality of applications (see, for example, Patent Document 1).

Patent Document 1: Japanese Laid-Open Patent Publication No. 2001-67236

For example, there is an operating system (hereinafter, "OS") for providing a file passing function for passing files between different applications. In order to use a file passing function of a conventional OS, the applications specify the type of processable file (for example, pdf) in the OS.

When the application of the file passing side performs a process of passing a file, the file passing function of the OS presents, to the user, a list of applications that can process the file that is the target of passing. The user selects, from the list, an application for passing a file, such that the file can be passed.

However, in a conventional file passing function, when the type of file is a generally well-known file type, the number of applications that can process the file to be passed increases, and therefore the number of applications included in the list increases.

SUMMARY OF THE INVENTION

The present invention provides a terminal device and a data passing method, in which one or more of the above-described disadvantages are eliminated.

According to an aspect of the present invention, there is provided a terminal device for passing data between programs, the terminal device including a data passing unit configured to receive the data from a first program and pass the received data to a second program selected from among one or more second programs associated with a type of the received data; the first program configured to convert the type of the data, which is a passing target, from an original type into a unique type, and then pass the data to the data passing unit; and the second program configured to convert the type of the data received from the data passing unit into the original type from the unique type, the second program being associated with the unique type.

According to an aspect of the present invention, there is provided a non-transitory computer-readable recording medium storing a program that causes a computer to execute a process, the computer constituting a terminal device for passing data between a first program and a second program, the terminal device including a data passing unit configured to receive the data from the first program and pass the received data to the second program selected from among one or more second programs associated with a type of the received data, the process including converting, by the first program, the type of the data, which is a passing target, from an original type into a unique type, and then passing the data to the data passing unit; and converting, by the second program, the type of the data received from the data passing unit into the original type from the unique type, the second program being associated with the unique type.

According to an aspect of the present invention, there is provided a data passing method executed by a terminal device for passing data between programs, the data passing method including converting, by a first program, a type of the data, which is a passing target, from an original type into a unique type, and then passing the data to a data passing unit; receiving, by the data passing unit, the data from the first program and passing the received data to a second program selected from among one or more second programs associated with the type of the received data; and converting, by the second program, the type of the data received from the data passing unit into the original type from the unique type, the second program being associated with the unique type.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description is given, with reference to the accompanying drawings, of embodiments of the present invention.

First Embodiment

<Hardware Configuration>

Figure 1:
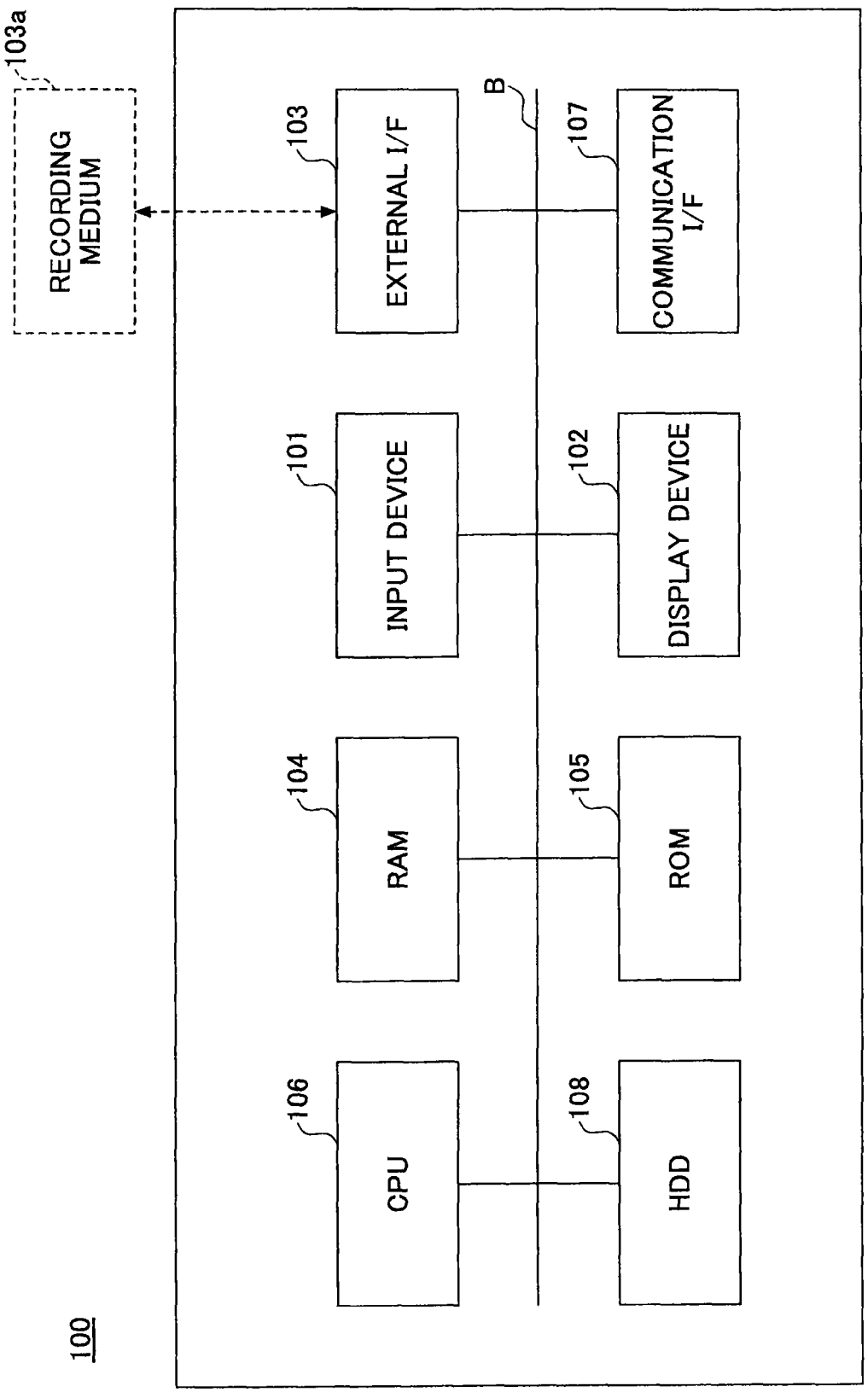
FIG. 1 illustrates an example of a hardware configuration of a computer according to an embodiment.

A terminal device according to the present embodiment is realized by a computer 100 having a hardware configuration, for example, as illustrated in FIG. 1. FIG. 1 illustrates an example of a hardware configuration of the computer 100 according to the present embodiment.

The computer 100 illustrated in FIG. 1 includes an input device 101, a display device 102, an external I/F 103, a RAM 104, a ROM 105, a CPU 106, a communication I/F 107, and a HDD 108, which are interconnected by a bus B.

The input device 101 includes a touch panel, a keyboard, and a mouse, and is used for inputting various operation signals to the computer 100. The display device 102 includes a display, and displays processing results obtained by the computer 100. Note that the input device 101 and the display device 102 may have a form of being connected and used according to need.

The communication I/F 107 is an interface for connecting the computer 100 to a network. Accordingly, the computer 100 can perform data communication with other computers 100 via the communication I/F 107.

Furthermore, the HDD 108 is an example of a non-volatile storage device storing programs and data. The stored programs and data include an OS which is the basic software for controlling the entire computer 100, and applications for providing various functions on the OS. Note that the computer 100 may use a drive device (for example, a solid state drive: SSD) using a flash memory as a storage medium. The storage areas in the HDD 108 that can be used by the applications are determined, and managed by the OS as described below.

The external I/F 103 is an interface between the computer 100 and an external device. An example of the external device is a recording medium 103a. Accordingly, the computer 100 can perform reading and/or writing with respect to the recording medium 103a via the external I/F 103. Examples of the recording medium 103a are a flexible disk, a CD, a DVD, an SD memory card, and a USB memory. The computer 100 may have a configuration without the external I/F 103.

The ROM 105 is an example of a non-volatile semiconductor memory (storage device) that can store programs and data even after the power is turned off. The ROM 105 stores programs and data such as BIOS which is executed when the computer 100 is activated, OS settings, and network settings. The RAM 104 is an example of a volatile semiconductor memory for temporarily storing programs and data.

The CPU 106 is a processor for implementing control and realizing functions of the entire computer 100, by loading programs and data in the RAM 104 from storage devices such as the ROM 105 and the HDD 108, and executing processes. Note that the computer 100 may have a hardware configuration other than that illustrated in FIG. 1; for example, the computer 100 may have a built-in camera, a microphone, and a speaker.

The terminal device according to the present embodiment can realize various processes as described below, by executing programs in the computer 100 having the above hardware configuration, for example.

<Software Configuration>

A terminal device 10 according to the present embodiment is realized by, for example, the following functional blocks.

<<Terminal Device>>

Figure 2:
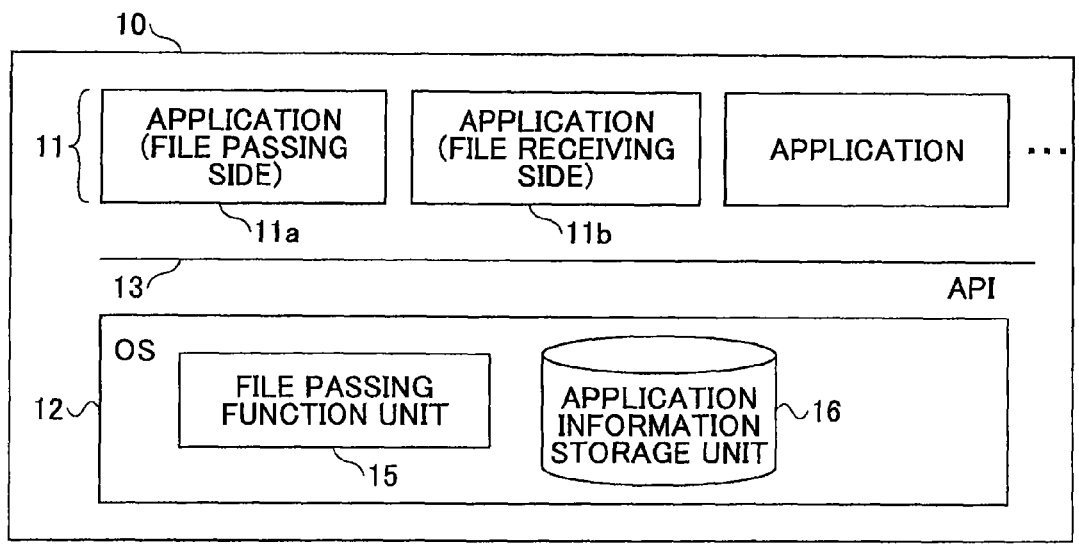
FIG. 2 is a functional block diagram of an example of a terminal device.

The terminal device 10 is realized by, for example, the functional blocks as illustrated in FIG. 2. FIG. 2 is a functional block diagram of an example of the terminal device 10.

The terminal device 10 includes a plurality of applications 11, an OS 12, and an API (Application Programming Interface) 13.

The plurality of applications 11 include an application 11a for passing files and an application 11b for receiving files. The OS 12 provides a file passing function for passing files between the applications 11. An example of the OS 12 for providing a file passing function is an iOS (registered trademark). The iOS provides an Open In function as a mechanism for passing files between different applications 11.

The OS 12 includes a file passing function unit 15 and an application information storage unit 16. As described below, the file passing function unit 15 passes a file specified by the application 11a of the file passing side, to the application 11b of the file receiving side. The application information storage unit 16 stores application information needed for the file passing function. In the application information, the type of file that is processable by each application 11 is specified.

The API 13 is an interface for the application 11 to use functions of the OS 12 such as the file passing function unit 15. The API 13 is a pre-defined interface that is provided for the OS 12 to receive requests from the application 11, and is constituted by functions, classes, etc.

Figure 3:
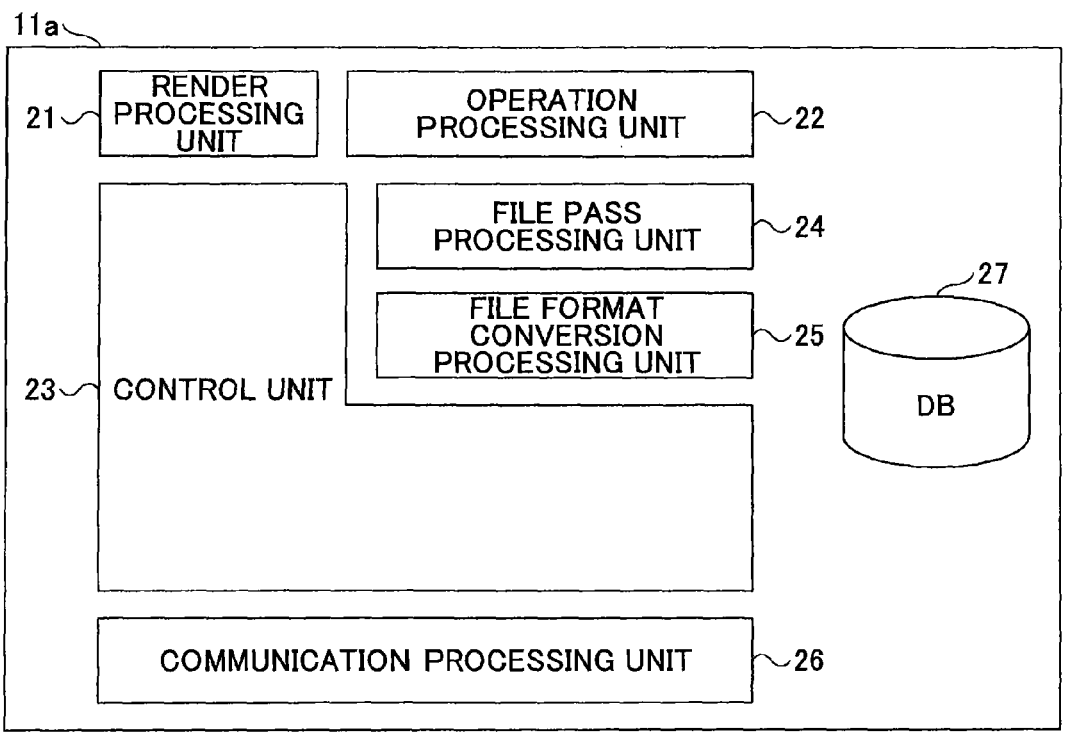
FIG. 3 is a functional block diagram of an example of an application of the file passing side.

FIG. 3 is a functional block diagram of an example of the application 11a of the file passing side. The application 11a of the file passing side includes a render processing unit 21, an operation processing unit 22, a control unit 23, a file pass processing unit 24, a file format conversion processing unit 25, a communication processing unit 26, and a DB 27.

The render processing unit 21 is a module for performing a process of rendering files, etc. The operation processing unit 22 is a module for determining an operation that the user has made with respect to the input device 101, and performing a process according to the operation. The communication processing unit 26 is a module for performing communication processes with other terminal devices 10. The communication processing unit 26 is not essential, and may be omitted in the case of an application 11a that does not need to perform communication processes with other terminal devices 10.

The file format conversion processing unit 25 is a module for performing a conversion process on the format (type) of the file. The file format conversion processing unit 25 implements a restriction on the application 11b of the file receiving side to which the file is passed as described below, by converting the format of a file into a unique format that is not generally used.

The file pass processing unit 24 is a module for performing a process of passing files to other applications 11 such as the application 11b. The file pass processing unit 24 uses the API 13 to call the file passing function unit 15 of the OS 12, and performs a process of passing files to other applications 11 such as the application 11b.

The database (DB) 27 stores various types of information used by the application 11a of the file passing side. The control unit 23 is a module that manages the processes of the render processing unit 21, the operation processing unit 22, the file pass processing unit 24, the file format conversion processing unit 25, and the communication processing unit 26.

Figures 4, 5:
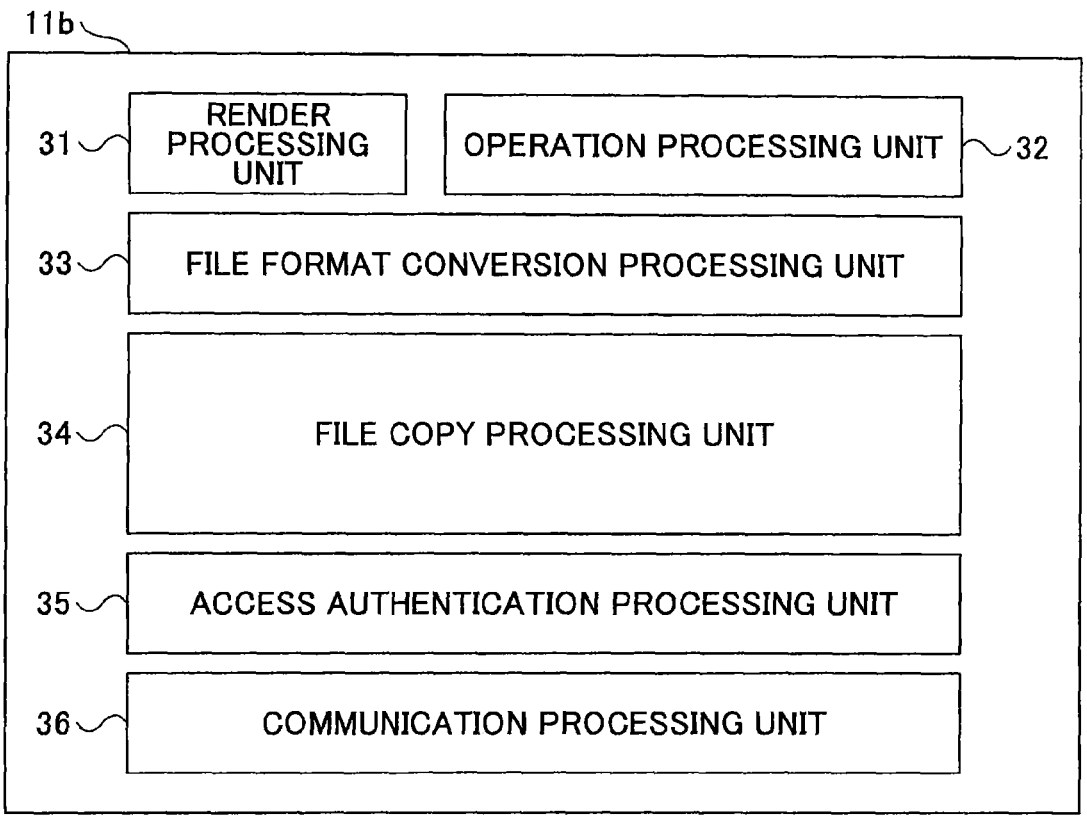
FIG. 4 is a functional block diagram of an example of an application of the file receiving side.
FIG. 5 is a configuration diagram of an example of application information stored by an application information storage unit.

FIG. 4 is a functional block diagram of an example of the application 11b of the file receiving side. The application 11b of the file receiving side includes a render processing unit 31, an operation processing unit 32, a file format conversion processing unit 33, a file copy processing unit 34, an access authentication processing unit 35, and a communication processing unit 36.

The render processing unit 31 is a module for performing a process of rendering files, etc. The operation processing unit 32 is a module for determining an operation that the user has made with respect to the input device 101, and performing a process according to the operation. The communication processing unit 36 is a module for performing communication processes with other terminal devices 10. The communication processing unit 36 is not essential, and may be omitted in the case of an application 11*b* that does not need to perform communication processes with other terminal devices 10.

The file format conversion processing unit 33 is a module for performing a conversion process on the format (type) of the file. The file format conversion processing unit 33 converts the file that has been converted into a unique format at the application 11*a* of the file passing side, back to the original file format, such that the file can be handled by the application 11*b* of the file receiving side.

The file copy processing unit 34 is a module for performing a process of copying files. The access authentication processing unit 35 is a module for performing an authentication process for accessing the copy destination of the file. Note that the file copy processing unit 34 expresses an example of a module for performing a process on a file. Furthermore, the access authentication processing unit 35 is not essential, and may be omitted in the case of an application 11*b* that does not require an authentication process.

FIG. 5 is a configuration diagram of an example of application information stored by the application information storage unit 16. The application information of FIG. 5 has a configuration in which the application names are associated with processable extensions. The application name is an example of identification information for identifying the application 11. The processable extension is an extension that specifies the type of file that is processable by the application 11. The processable extension is an example of information specifying the type of file that is processable by the application 11. The application information of FIG. 5 expresses the type of file that is processable by each application, which is declared by each application 11 in the source code level.

For example, in the application information of FIG. 5, as the extensions of files processable by the application names "application A" and "application C", doc, jpg, and pdf are specified, as examples of typical extensions. Furthermore, in the application information of FIG. 5, as the extension of files processable by the application name "application B", ric_abc is specified, which is an example of a unique extension determined in advance.

When the file passing function unit 15 receives a specification of a file from the application 11*a* of the file passing side, by using the application information of FIG. 5, the file passing function unit 15 can create a list of applications 11*b* of the file receiving side that can process the specified file.

For example, as the extension of the file processable by the application name "application B" in FIG. 5, a unique extension that is determined in advance (for example, ric_abc) is specified. Therefore, when the file passing function unit 15 receives a specification of a file having a unique extension (for example, ric_abc) from the application 11*a* of the file passing side, the file passing function unit 15 creates a list of application names associated with the unique extension in the application information of FIG. 5.

Therefore, in the terminal device 10 of FIG. 2, by converting the format of the file into a unique format at the application 11*a* of the file passing side, it is possible to restrict the application names displayed in the list to those intended by the user.

<Details of Process>

In the following, a description is given of details of processes by the terminal device 10 according to the present embodiment. The application 11*a* of the terminal device 10 passes files to the application 11*b* by using the file passing function of the OS 12.

Here, as one example, a description is given of a process of passing a file, which has been used at the application 11*a* of the terminal device 10, to the application 11*b* by the file passing function of the OS 12, and storing the file in a predetermined folder at the application 11*b*.

<<File Passing Process>>

Figure 6:
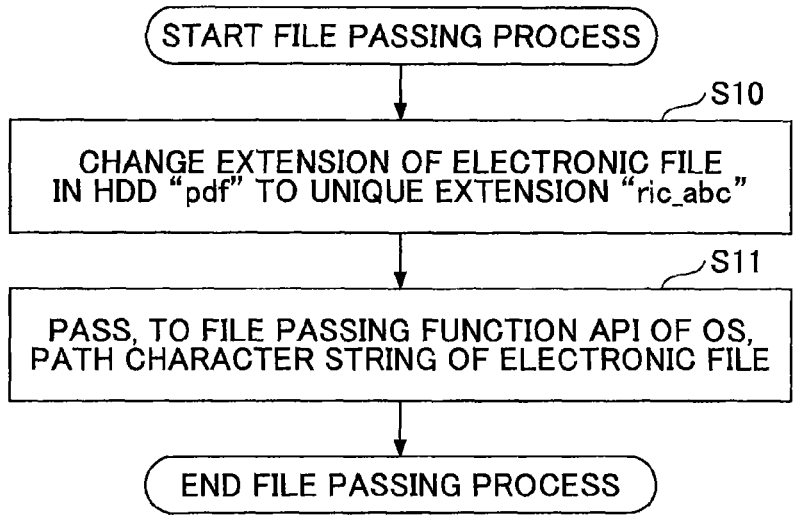
FIG. 6 is a flowchart of an example of a file passing process.

When a user operating the terminal device 10 wants to pass a file, which has been used at the application 11*a*, to the application 11*b*, the user presses (taps), for example, a file transfer button that is displayed on a screen by the render processing unit 21 of the application 11*a*. When the file transfer button is pressed, the control unit 23 of the application 11*a* starts a file passing function illustrated in FIG. 6. FIG. 6 is a flowchart of an example of a file passing process.

In step S10, the control unit 23 specifies a file to be a target of the file passing process, and requests the file format conversion processing unit 25 to perform a process of converting the file format. The file format conversion processing unit 25 converts the extension (for example, pdf) of a target file in the storage area of the HDD 108 assigned to the application 11*a*, to a unique extension (for example, ric_abc) that is determined in advance.

In step S11, the control unit 23 sends a request for a file passing process to the file pass processing unit 24. The file pass processing unit 24 sends the request for the file passing process to the file passing function unit 15 of the OS 12, by passing, to the API 13 of the file passing function, the path character string of the target file whose extension has been converted into a unique extension.

<<Target Application Icon Display Process>>

Figure 7:
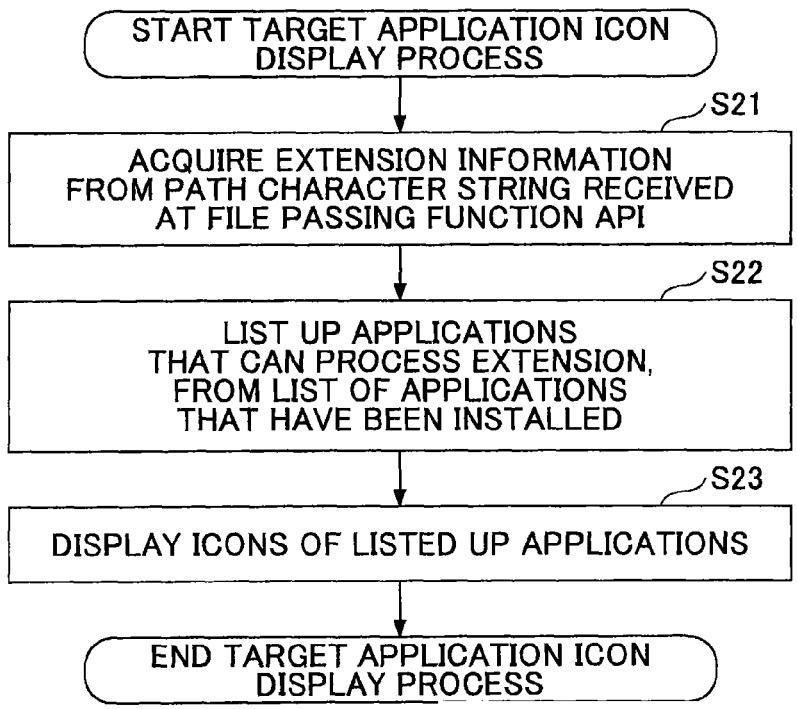
FIG. 7 is a flowchart of an example of a target application icon display process.

The file passing function unit 15 of the OS 12, which has received the request to perform the file passing process, starts a target application icon display process as illustrated in FIG. 7. FIG. 7 is a flowchart of an example of a target application icon display process.

In step S21, the file passing function unit 15 acquires a unique extension determined in advance (for example, ric_abc), as extension information from the path character string of the target file of the file passing process.

In step S22, the file passing function unit 15 lists the applications 11 that are associated with the unique extension determined in advance in the application information of FIG. 5, which is acquired as extension information from the path character string of the target file of the file passing process.

In step S23, the file passing function unit 15 displays, on a screen, the icons of the applications 11 that have been listed, as applications 11 that can process the target file of the file passing process.

Figure 8:
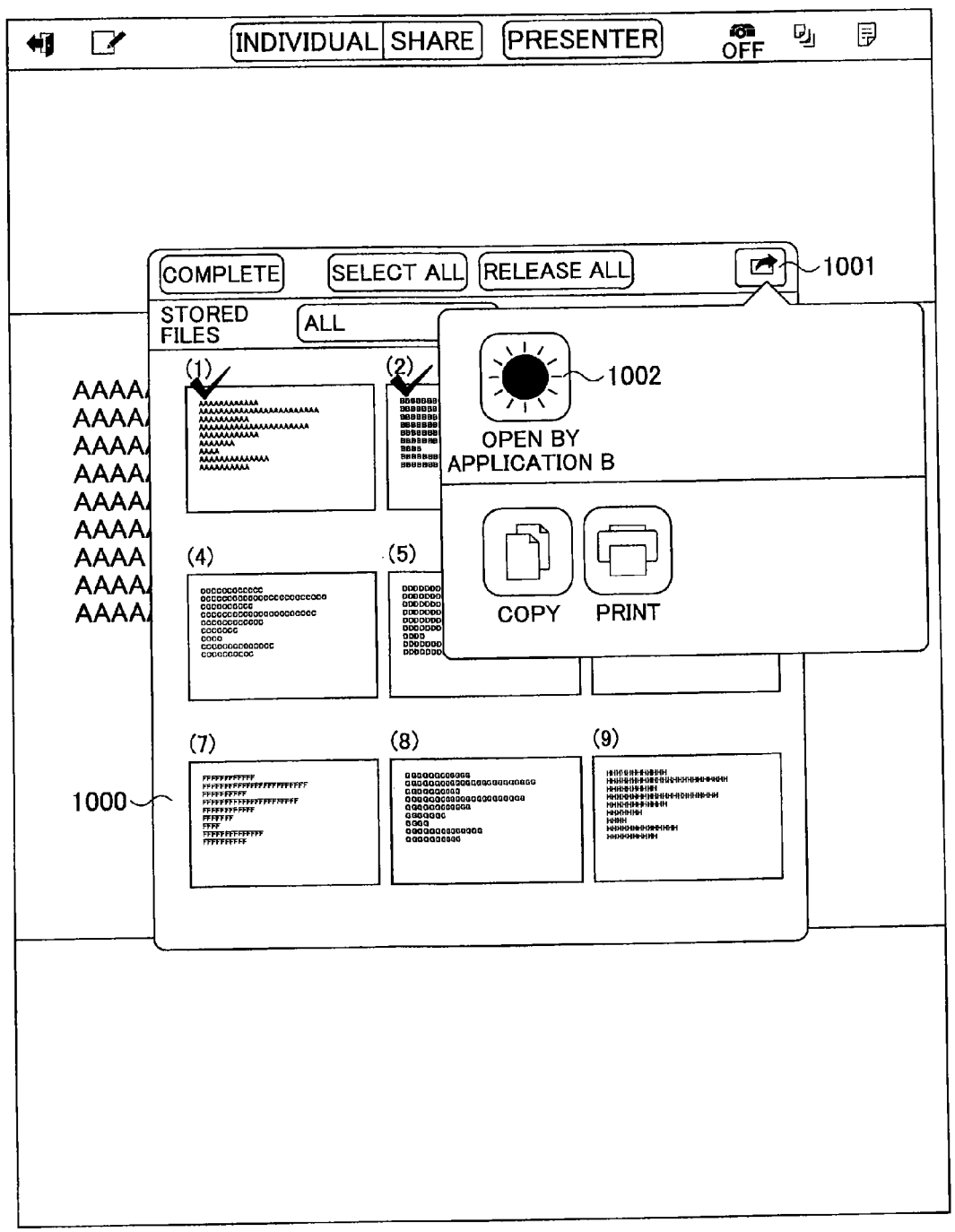
FIG. 8 illustrates an example of a screen image in which icons of applications that can process the target file are displayed.

FIG. 8 illustrates an example of a screen image in which icons of applications that can process the target file are displayed. In the screen image of FIG. 8, a user has pressed a file transfer button 1001 provided in a screen 1000 displayed by the render processing unit 21 of the application 11*a*, and therefore an icon 1002 of the application 11*b* that can process the target file, is displayed.

Figure 9:
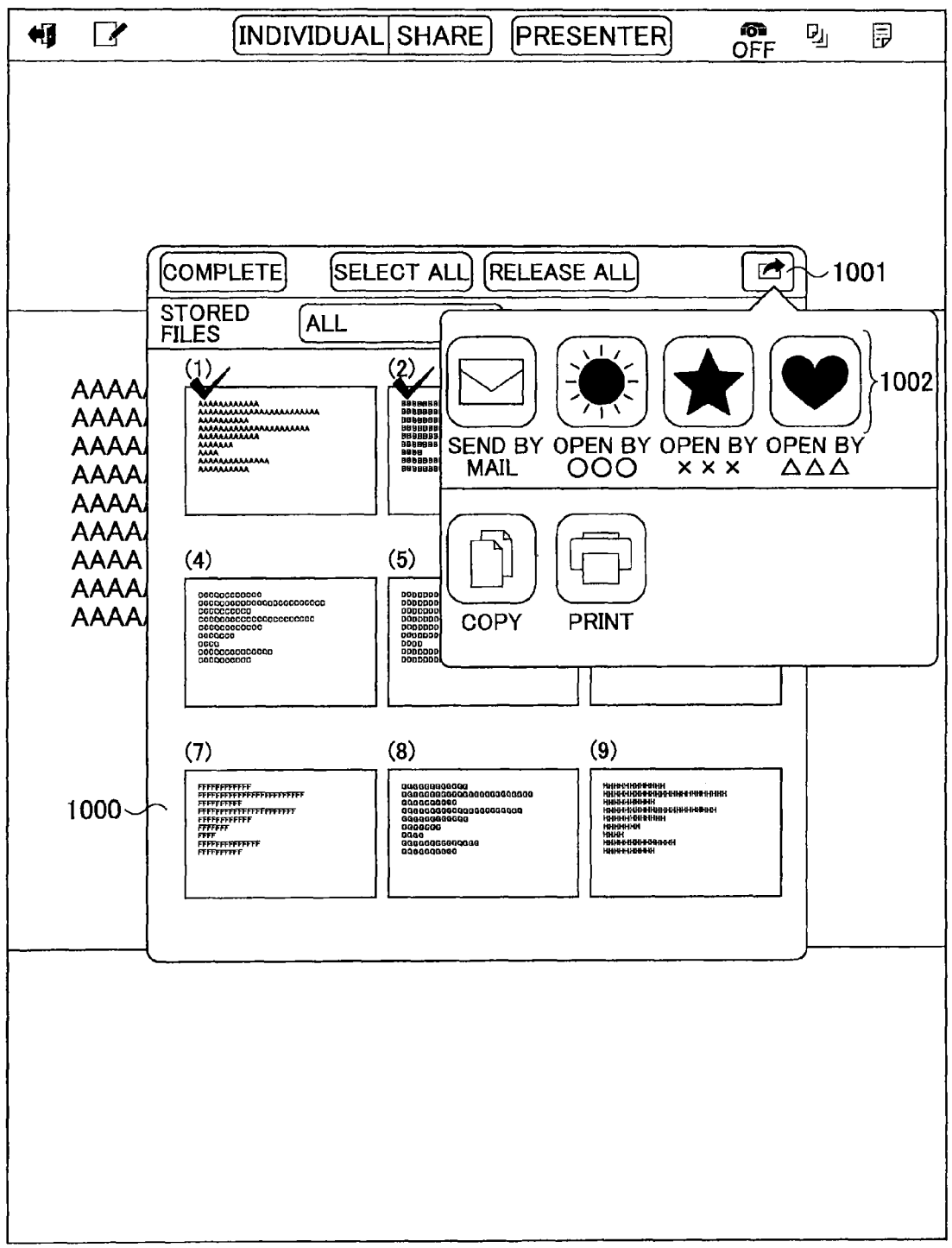
FIG. 9 illustrates an example of a screen image in which icons of applications that can process the target file are displayed.

Note that in step S21, when the file passing function unit 15 has acquired a generally used extension (for example, pdf), icons 1002 of applications 11 that have been listed are displayed, as illustrated in FIG. 9.

FIG. 9 illustrates an example of a screen image in which icons of applications that can process the target file are displayed. In the screen image of FIG. 9, the user has pressed the file transfer button 1001 provided in the screen 1000 displayed by the render processing unit 21 of the application 11*a*, and therefore icons 1002 of a plurality of applications 11 that can process the target file, are displayed.

As described above, in the terminal device 10 according to the present embodiment, the file passing side converts the extension of a file into a unique extension, and the unique extension is declared as the extension of the file that can be processed by the file receiving side, such that the icons 1002 displayed in the list can be restricted to those intended by the user.

Therefore, even in a case where a generally used type of file is passed to the application 11*b* of the file receiving side, the terminal device 10 according to the present embodiment is able to restrict the icons 1002 displayed in the list to those intended by the user. As a result, it is possible for the terminal device 10 according to the present embodiment to prevent the user from erroneously selecting an icon 1002 that is not intended by the user.

<<File Receiving Process>>

The user operating the terminal device 10 can select the application 11*b* of the file receiving side to which the target file is to be passed, by pressing the icon 1002 displayed in, for example, the screen image of FIG. 8. For example, when the icon 1002 displayed in the screen image of FIG. 8 is pressed, the file passing function unit 15 of the OS 12 starts a file receiving process as illustrated in FIG. 10.

Figure 10:
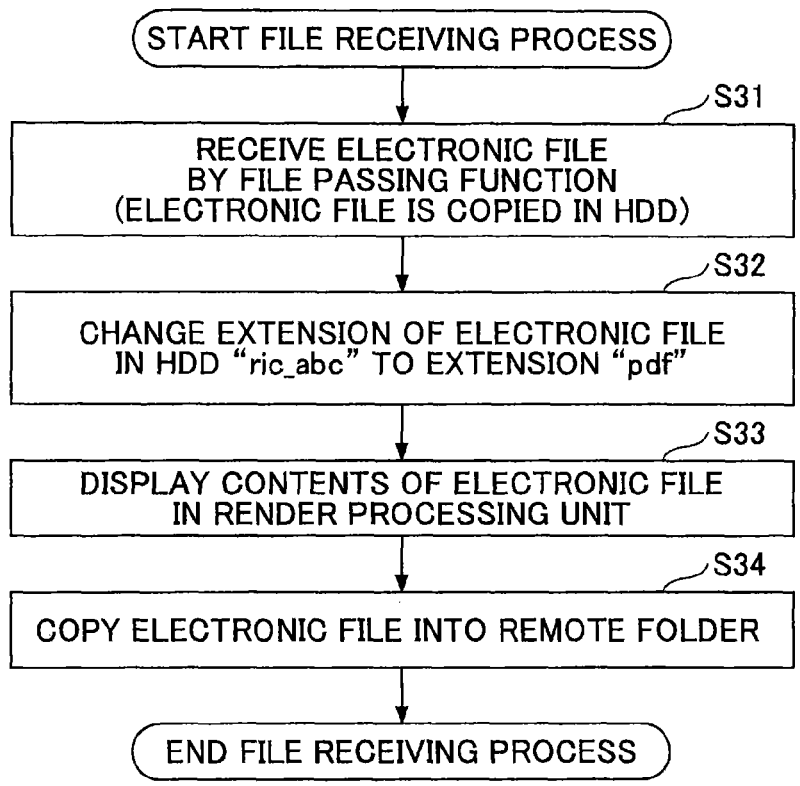
FIG. 10 is a flowchart of an example of a file receiving process.

FIG. 10 is a flowchart of an example of a file receiving process. In step S31, the file passing function unit 15 copies the target file, from the storage area for the application 11*a* of the file passing side, to the storage area of the application 11*b* of the file receiving side selected by the user. The storage areas of the applications 11*a* and 11*b* are assigned to, for example, storage areas in the HDD 108. The OS 12 copies the target file into the storage area for the application 11*b* of the file receiving side, and then activates the application 11*b* of the file receiving side.

In step S32, the file format conversion processing unit 33 of the application 11*b* converts the extension of the target file that has been copied into the storage area for the application 11*b*, from the unique extension to the original extension determined in advance (for example, pdf).

In step S33, the render processing unit 31 of the application 11*b* performs a process of rendering contents of the file. Furthermore, in step S34, the file copy processing unit 34 of the application 11*b* performs a process of copying the target file, such as copying the target file into a remote folder.

Note that in step S33, it is possible to confirm with the user whether to execute the process of step S34 on the file whose contents are displayed, or the process of step S34 may be executed without confirming with the user.

(Overview)

According to the terminal device 10 according to the present embodiment, it is possible to pass a target file of a generally used type from the application 11*a* of the file passing side, to an intended, specific application 11*b* of the file receiving side.

Second Embodiment

In the first embodiment, it is assumed that the application 11*b* of the file receiving side knows in advance of the original extension of the target file converted into a unique extension by the application 11*a* of the file passing side. However, in the second embodiment, the application 11*b* of the file receiving side is able to convert the unique extension to the original extension, even when the application 11*b* does not know in advance of the original extension of the target file converted into a unique extension by the application 11*a* of the file passing side.

Note that the hardware configuration and the software configuration of the second embodiment are the same as those of the first embodiment, and therefore descriptions thereof are omitted.

<Details of Process>

In the following, a description is given of details of processes by the terminal device 10 according to the present embodiment. The application 11*a* of the terminal device 10 passes files to the application 11*b* by using the file passing function of the OS 12.

Here, as one example, a description is given of a process of passing a file, which has been used at the application 11*a* of the terminal device 10, to the application 11*b* by the file passing function of the OS 12, and storing the file in a predetermined folder at the application 11*b*.

<<File Passing Process>>

Figure 11:
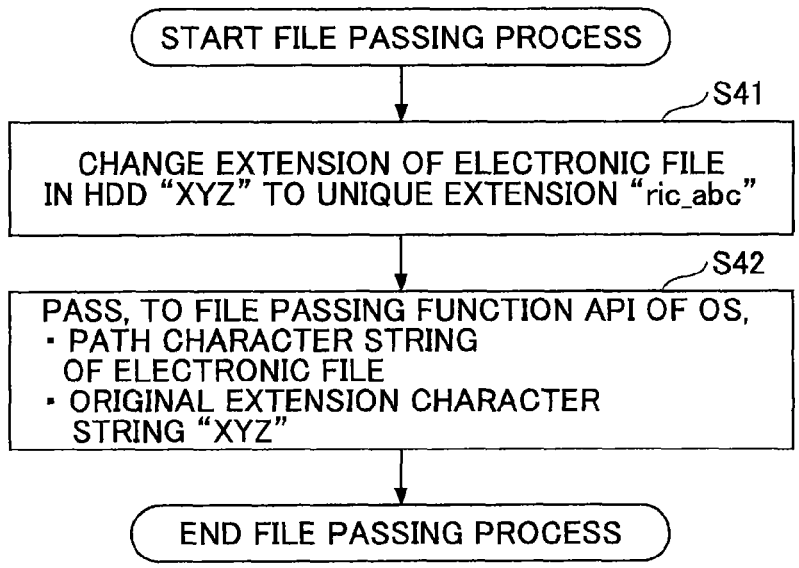
FIG. 11 is a flowchart of another example of a file passing process.

When a user operating the terminal device 10 wants to pass a file, which has been used at the application 11*a*, to the application 11*b*, the user presses (taps), for example, a file transfer button that is displayed on a screen by the render processing unit 21 of the application 11*a*. When the file transfer button is pressed, the control unit 23 of the application 11*a* starts a file passing function illustrated in FIG. 11. FIG. 11 is a flowchart of another example of a file passing process.

In step S41, the control unit 23 specifies a file to be a target of the file passing process, and requests the file format conversion processing unit 25 to perform a process of converting the file format. The file format conversion processing unit 25 converts an arbitrary extension (for example, XYZ) of a target file in the storage area of the HDD 108 assigned to the application 11*a*, to a unique extension (for example, ric_abc) that is determined in advance.

In step S42, the control unit 23 sends a request for a file passing process to the file pass processing unit 24. The file pass processing unit 24 sends a request for the file passing process to the file passing function unit 15 of the OS 12, by passing, to the API 13 of the file passing function, the path character string of the target file whose extension has been converted into a unique extension, and the original extension character string (for example, XYZ).

<<Target Application Icon Display Process>>

The target application icon display process performed by the file passing function unit 15 of the OS 12, which has received the request to perform the file passing process, is the same as that of the first embodiment, and therefore descriptions thereof are omitted.

<<File Receiving Process>>

The user operating the terminal device 10 can select the application 11*b* of the file receiving side to which the target file is to be passed, by pressing the icon 1002 displayed in, for example, the screen image of FIG. 8. For example, when the icon 1002 displayed in the screen image of FIG. 8 is pressed, the file passing function unit 15 of the OS 12 starts a file receiving process as illustrated in FIG. 12.

Figure 12:
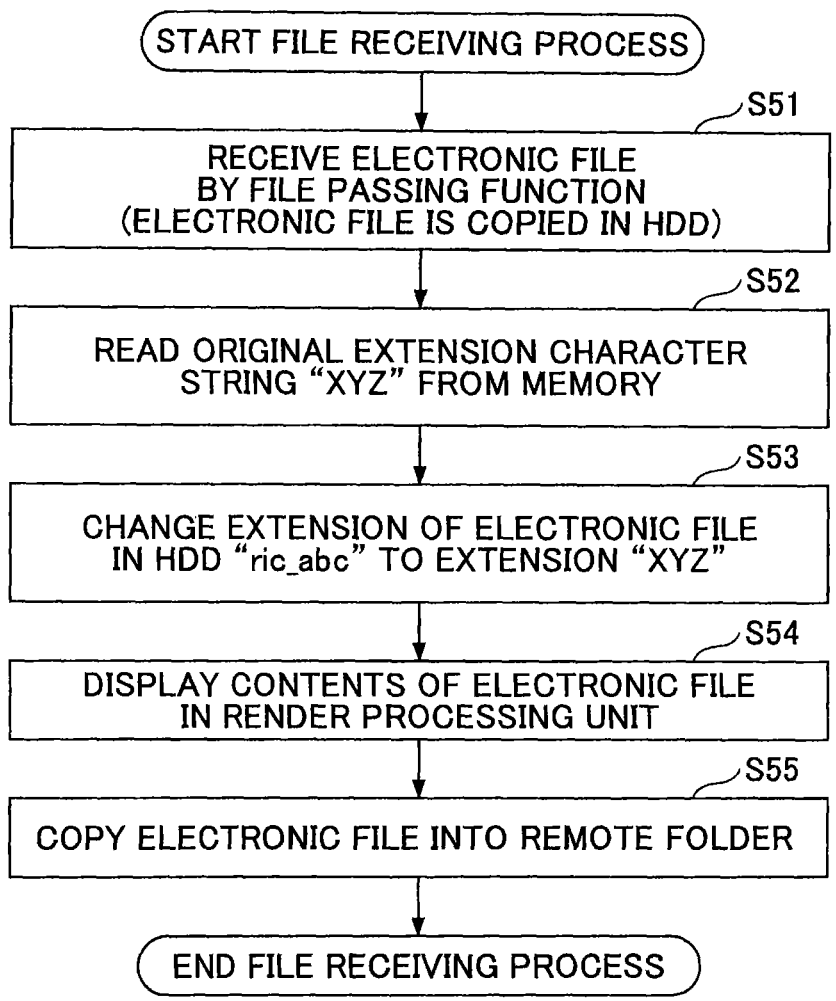
FIG. 12 is a flowchart of an example of a file receiving process.

FIG. 12 is a flowchart of an example of a file receiving process. In step S51, the file passing function unit 15 copies the target file, from the storage area for the application 11*a* of the file passing side, to the storage area of the application 11*b* of the file receiving side selected by the user. The OS 12 copies the target file into the storage area for the application 11*b* of the file receiving side, and then activates the application 11*b* of the file receiving side. Furthermore, the OS 12 writes the original extension character string (for example, XYZ), into a specific address in the memory space of the application 11b of the file receiving side.

In step S52, the file format conversion processing unit 33 of the application 11b reads the original extension character string from the specific address in the memory space of the application 11b.

In step S53, the file format conversion processing unit 33 of the application 11b converts the extension of the target file that has been copied into the storage area for the application 11b, into the original extension (for example, XYZ) read in step S52.

In step S54, the render processing unit 31 of the application 11b performs a process of rendering contents of the file. Furthermore, in step S55, the file copy processing unit 34 of the application 11b performs a process of copying the target file, such as copying the target file into a remote folder.
(Overview)

According to the terminal device 10 according to the present embodiment, it is possible to convert the unique extension to the original extension at the application 11b of the file receiving side, even when the application 11b does not know in advance the original extension of the target file whose extension has been converted into a unique extension by the application 11a of the file passing side.

According to the terminal device 10 according to the present embodiment, it is possible to pass a target file of a generally used type from the application 11a of the file passing side, to an intended, specific application 11b of the file receiving side.

Third Embodiment

In the third embodiment, a function for improving security is added to the first and second embodiments. Note that the hardware configuration of the third embodiment is the same as those of the first and second embodiments, and therefore descriptions thereof are omitted.
<Software Configuration>

The terminal device 10 according to the present embodiment is different from that of the first and second embodiments in terms of the configurations of the application 11a of the file passing side and the application 11b of the file receiving side.
<<Terminal Device>>

Figure 13:
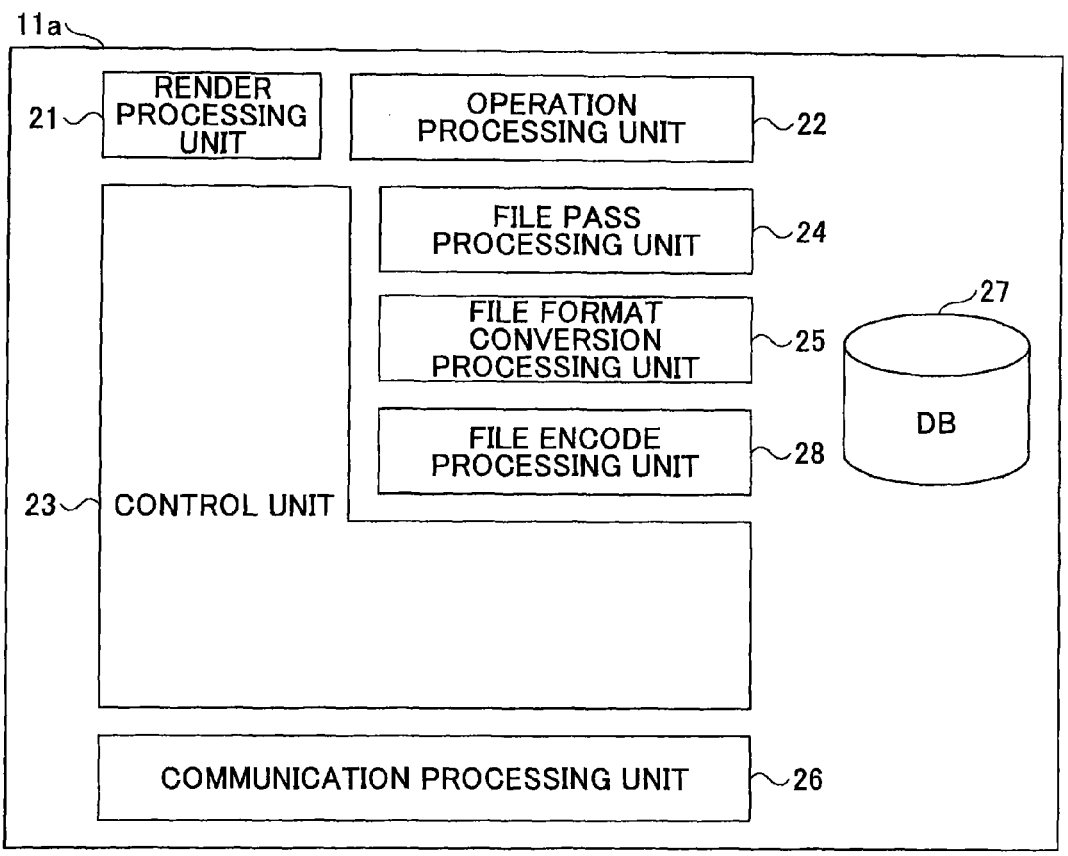
FIG. 13 is a functional block diagram of an example of an application of the file passing side.

The terminal device 10 is realized by, for example, the functional blocks as illustrated in FIG. 2. The application 11a of the file passing side has a configuration as illustrated in FIG. 13. FIG. 13 is a functional block diagram of an example of the application 11a of the file passing side.

The application 11a of the file passing side has a file encode processing unit 28 added to the configuration illustrated in FIG. 3. The file encode processing unit 28 is a module for performing a process of encoding binary data of the target file into another format determined in advance (for example, Base64 and zip).

Figure 14:
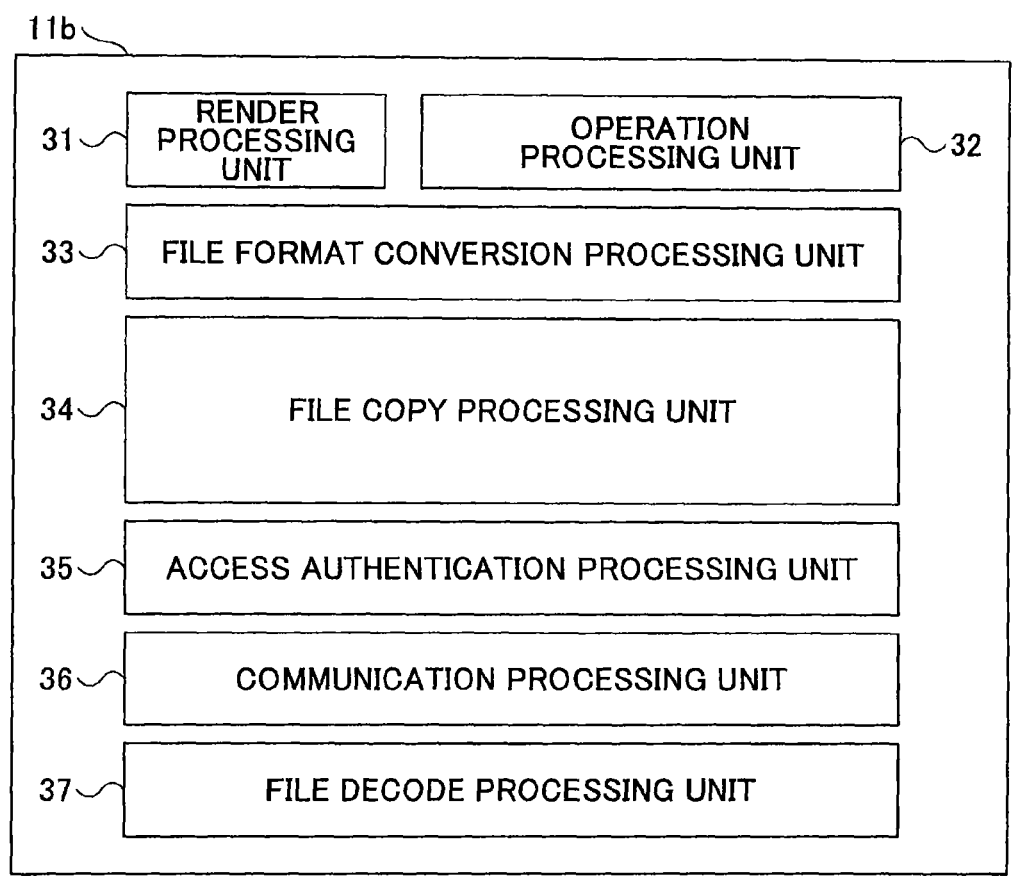
FIG. 14 is a functional block diagram of an example of an application of the file receiving side.

FIG. 14 is a functional block diagram of an example of the application 11b of the file receiving side. The application 11b of the file receiving side of FIG. 14 has a file decode processing unit 37 added to the configuration illustrated in FIG. 4. The file decode processing unit 37 is a module for performing a process of decoding binary data of the target file.
<Details of Process>

In the following, a description is given of details of processes by the terminal device 10 according to the present embodiment. The application 11a of the terminal device 10 passes files to the application 11b by using the file passing function of the OS 12.

Here, as one example, a description is given of a process of passing a file, which has been used at the application 11a of the terminal device 10, to the application 11b by the file passing function of the OS 12, and storing the file in a predetermined folder at the application 11b.
<<File Passing Process>>

Figure 15:
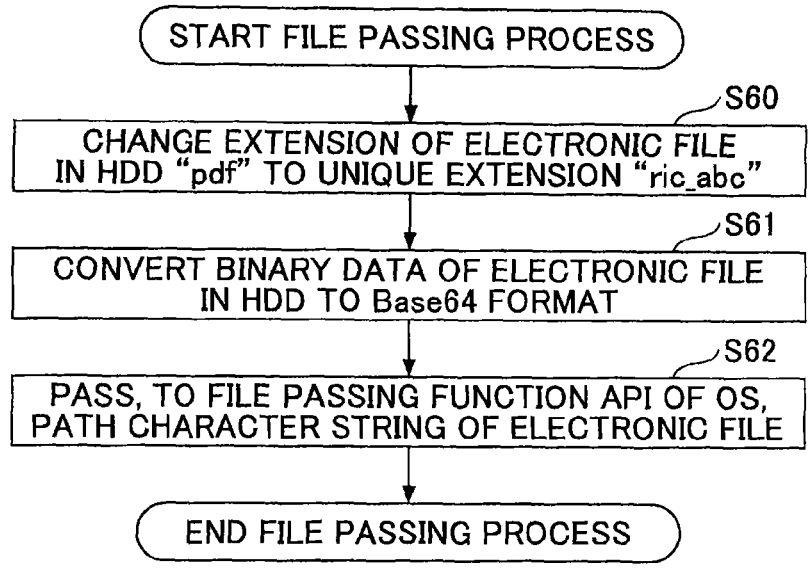
FIG. 15 is a flowchart of another example of a file passing process.

When a user operating the terminal device 10 wants to pass a file, which has been used at the application 11a, to the application 11b, the user presses (taps), for example, a file transfer button that is displayed on a screen by the render processing unit 21 of the application 11a. When the file transfer button is pressed, the control unit 23 of the application 11a starts a file passing function illustrated in FIG. 15. FIG. 15 is a flowchart of another example of a file passing process.

In step S60, the control unit 23 specifies a file to be a target of the file passing process, and requests the file format conversion processing unit 25 to perform a process of converting the file format. The file format conversion processing unit 25 converts an extension (for example, pdf) of a target file in the storage area of the HDD 108 assigned to the application 11a, to a unique extension (for example, ric_abc) that is determined in advance.

In step S61, the control unit 23 requests the file encode processing unit 28 to perform a process of encoding the target file whose extension has been converted into a unique extension at step S60. The file encode processing unit 28 converts the binary data of the target file into a format determined in advance (for example, Base64).

In step S62, the control unit 23 sends a request for a file passing process to the file pass processing unit 24. The file pass processing unit 24 sends a request for the file passing process to the file passing function unit 15 of the OS 12, by passing, to the API 13 of the file passing function, the path character string of the target file whose extension has been converted into a unique extension and whose binary data has been encoded into a format determined in advance.
<<Target Application Icon Display Process>>

The target application icon display process performed by the file passing function unit 15 of the OS 12, which has received the request to perform the file passing process, is the same as that of the first embodiment, and therefore descriptions thereof are omitted.
<<File Receiving Process>>

The user operating the terminal device 10 can select the application 11b of the file receiving side to which the target file is to be passed, by pressing the icon 1002 displayed in, for example, the screen image of FIG. 8. For example, when the icon 1002 displayed in the screen image of FIG. 8 is pressed, the file passing function unit 15 of the OS 12 starts a file receiving process as indicated in FIG. 16.

Figure 16:
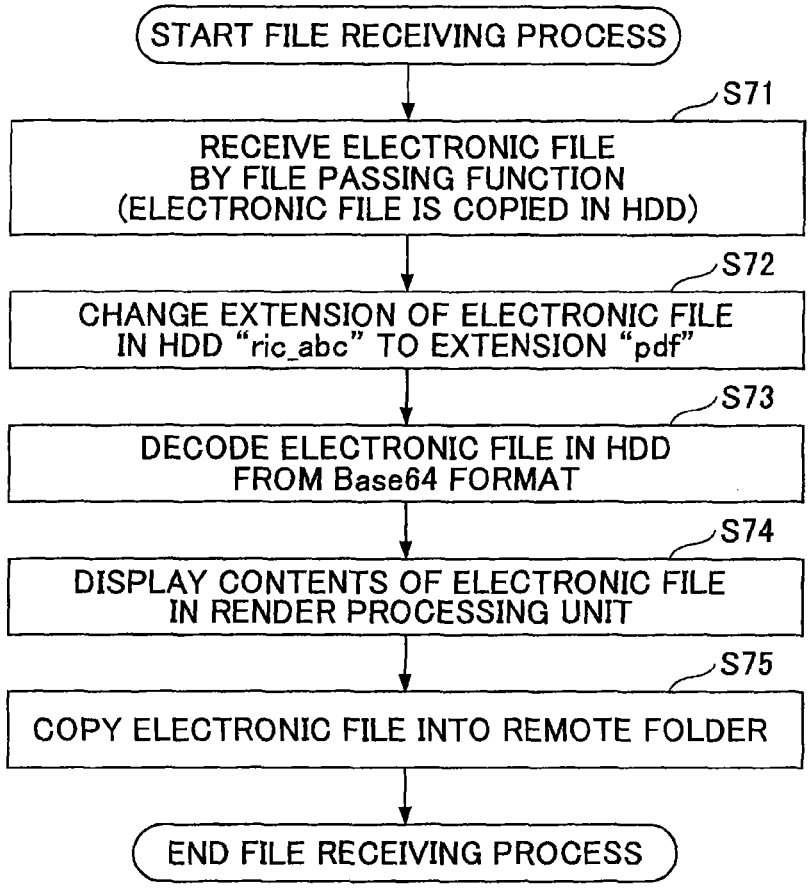
FIG. 16 is a flowchart of an example of a file receiving process.

FIG. 16 is a flowchart of an example of a file receiving process. In step S71, the file passing function unit 15 copies the target file, from the storage area for the application 11a of the file passing side, to the storage area of the application 11b of the file receiving side selected by the user. The OS 12 copies the target file into the storage area for the application 11b of the file receiving side, and then activates the application 11b of the file receiving side.

In step S72, the file format conversion processing unit 33 of the application 11b converts the extension of the target file that has been copied into the storage area for the application 11b, from the unique extension to the original extension determined in advance (for example, pdf).

In step S73, the file decode processing unit 37 of the application 11b decodes the binary data of the target file from the format determined in advance (for example, Base64).

In step S74, the render processing unit 31 of the application 11b performs a process of rendering contents of the file. Furthermore, in step S75, the file copy processing unit 34 of the application 11b performs a process of copying the target file, such as copying the target file into a remote folder.

Note that in the third embodiment, a description is given of an example of improving the security of the first embodiment as details of the process; however, the same applies to the case of improving the security of the second embodiment.

(Overview)

According to the terminal device 10 according to the present embodiment, the target file cannot be normally handled or displayed unless the file has been decoded at the application 11b of the file receiving side, and therefore security is improved.

According to the terminal device 10 according to the present embodiment, the security is improved in a case of passing a target file of a generally used type from the application 11a of the file passing side to a specific, intended application 11b of the file receiving side.

Fourth Embodiment

Figure 17:
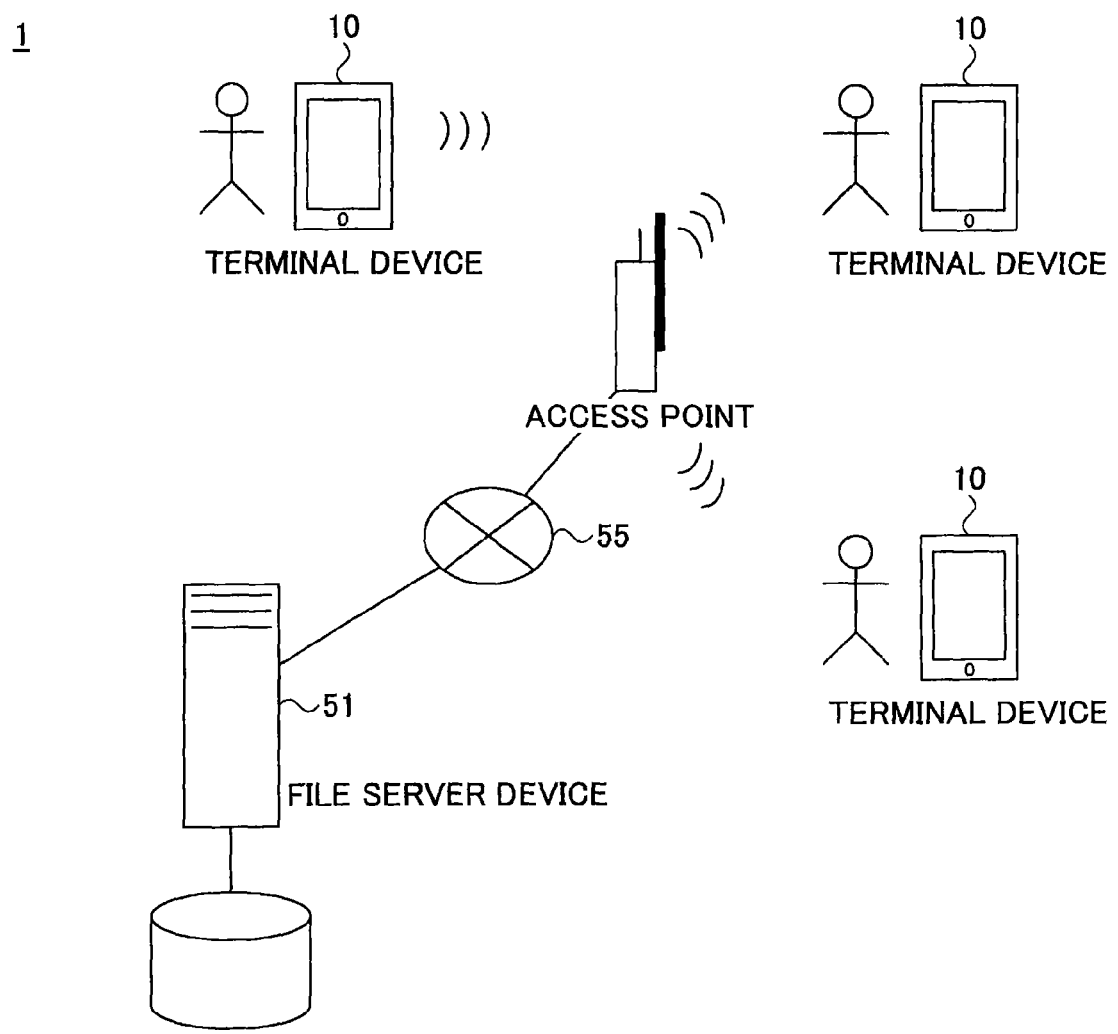
FIG. 17 illustrates a configuration of an example of a data sharing system.
Figure 18:
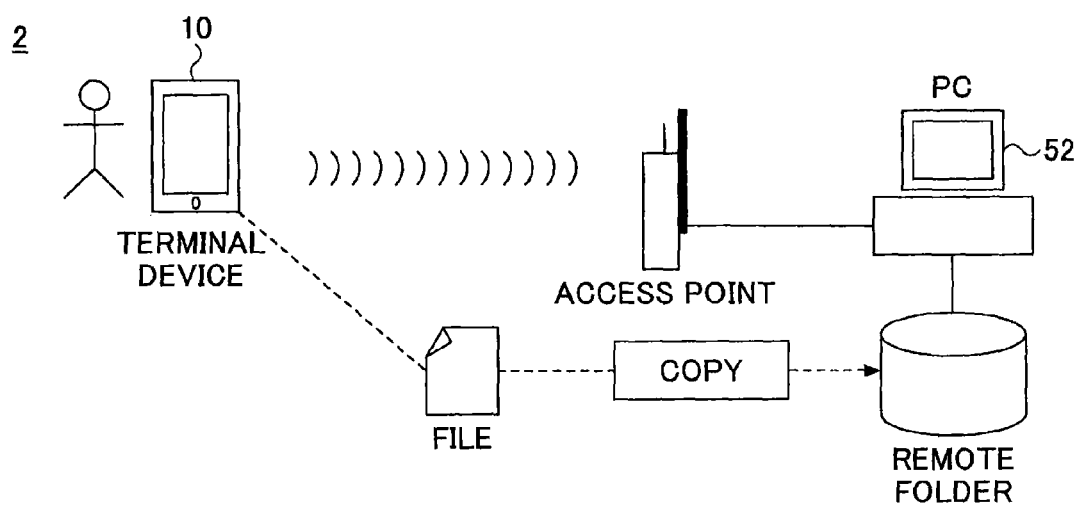
FIG. 18 illustrates a configuration of an example of a data storing system.
Figure 19:
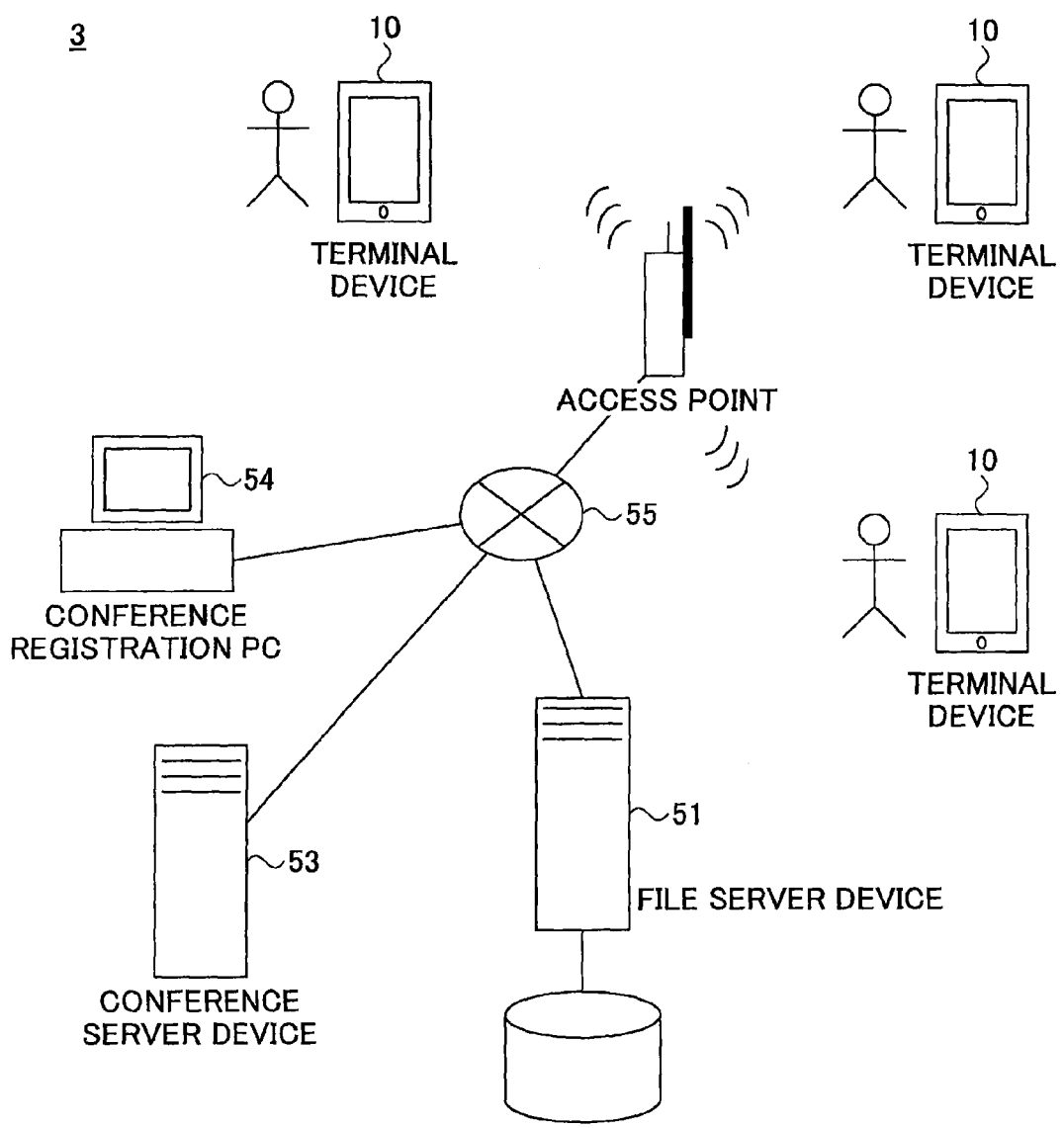
FIG. 19 illustrates a configuration of an example of a conference system.

The terminal device 10 according to the first through third embodiments can be applied to, for example, various systems as illustrated in FIGS. 17 through 19.

FIG. 17 illustrates a configuration of an example of a data sharing system. In a data sharing system 1 illustrated in FIG. 17, a plurality of the terminal devices 10 according to the present embodiment are connected, such that data communication is possible, to a file server device 51 via an access point and a network 55. FIG. 17 illustrates an example where the terminal devices 10 are connected to the network 55 in a wireless manner; however, the terminal devices 10 may be connected to the network 55 in a wired manner.

It is assumed that, in each of the terminal devices 10, a data sharing application, which is an example of the application 11a of the file passing side, and a file server access application, which is an example of the application 11b of the file receiving side, are activated.

For example, it is assumed that one of the users operating the terminal device 10 (user A) has a file, which is to be shared with other users (users B and C), registered in advance in the data sharing application of the terminal device 10 of itself. The data sharing application of the terminal device 10 of the user A displays the registered files.

The users B and C access the terminal device 10 of the user A via the data sharing application of the respective terminal devices 10 of themselves, and download the file to be shared from the terminal device 10 of the user A to the terminal devices 10 of themselves. Then, the data sharing applications in the terminal devices 10 of the users B and C display the downloaded files.

There may be cases where the users A, B, and C want to send the displayed file from the terminal devices 10 of themselves to the file server device 51, to be stored in the file server device 51. In this case, the users A, B and C need to pass the displayed file from the data sharing application to the file server access application. The contents of the first through third embodiments may be applied to the process performed by the terminal device 10, of passing the displayed file from the data sharing application to the file server access application.

FIG. 18 illustrates a configuration of an example of a data storing system. In a data storing system 2 illustrated in FIG. 18, a plurality of the terminal devices 10 according to the present embodiment are connected, such that data communication is possible, to a PC 52 via an access point. Note that FIG. 18 illustrates an example where the terminal devices 10 are connected to the PC 52 in a wireless manner; however, the terminal devices 10 may be connected to the PC 52 in a wired manner.

It is assumed that, in each of the terminal devices 10, a data sharing application, which is an example of the application 11a of the file passing side, and a file server access application, which is an example of the application 11b of the file receiving side, are activated.

There may be cases where the user wants to send the displayed file from the terminal device 10 of itself to a remote folder in the PC 52, to be stored in the remote folder in the PC 52. In this case, the user needs to pass the displayed file from the data sharing application to the file server access application. The contents of the first through third embodiments may be applied to the process performed by the terminal device 10, of passing the displayed file from the data sharing application to the file server access application.

FIG. 19 illustrates a configuration of an example of a conference system. In a conference system 3 illustrated in FIG. 19, a plurality of the terminal devices 10 according to the present embodiment are connected, such that data communication is possible, to a file server device 51, a conference server device 53, and a conference registration PC 54, via an access point and a network 55. FIG. 19 illustrates an example where the terminal devices 10 are connected to the network 55 in a wireless manner; however, the terminal devices 10 may be connected to the network 55 in a wired manner.

The conference registration PC 54 has a function of registering, in the conference server device 53, conference information in which various types of information relevant to the conference are set, and files (conference materials) to be shared in the conference. The user is able to register the conference information and files from the conference registration PC 54 in the conference server device 53.

The conference server device 53 manages the conference information and files. Furthermore, the conference server device 53 has a function of holding a conference, controlling the attendance in the conference, and distributing the input operations by the presenter to the terminal devices 10 attending the conference, in a real-time manner.

It is assumed that, in each of the terminal devices 10, a data sharing application, which is an example of the application 11a of the file passing side, and a file server access application, which is an example of the application 11b of the file receiving side, are activated.

The user attending the conference uses the conference application of the terminal device 10 of itself, to download the file to be shared in the conference from the conference server device 53, and to display the file. There may be cases where the user attending the conference wants to send the displayed file from the terminal device 10 of itself to the file server device 51, to be stored in the file server device 51.

In this case, the user needs to pass the displayed file from the conference application to the file server access application, and the file needs to be stored in the file server device 51 by transferring the file from the server access application. The contents of the first through third embodiments may be applied to the process performed by the terminal device 10, of passing the displayed file from the conference application to the file server access application.

The terminal device and the data passing method are not limited to the specific embodiments described herein, and variations and modifications may be made without departing from the spirit and scope of the present invention.

For example, as examples of systems to which the contents of the first through third embodiments may be applied, the data sharing system 1, the data storing system 2, and the conference system 3 are indicated; however, the contents of the first through third embodiments may be applied to various systems for passing files between applications.

For example, the application 11*a* of the file passing side is an example of a first program. The application 11*b* of the file receiving side is an example of a second program. The file passing function unit 15 is an example of a data passing unit.

Note that the above configuration of the terminal device 10 is one example, and it is needless to say that various configuration examples are applicable according to the applications and purposes.

According to an embodiment of the present invention, it is possible to restrict the passing of data between programs, regardless of the type of the data.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

The present application is based on and claims the benefit of priority of Japanese Priority Patent Application No. 2014-032497, filed on Feb. 24, 2014, the entire contents of which are hereby incorporated herein by reference.

What is claimed is:

1. A terminal device, comprising:
processing circuitry configured to:
execute a first application capable of passing data to another application;
execute a plurality of second applications;
store an extension of data that is associated with each of the plurality of second applications;
control a display to display a list of applications capable of processing the data associated with the extension, from among the plurality of second applications, in response to a request from a user to pass the data to the other application; and
receive the data from the first application and pass the data to a second application selected from the list of the applications displayed by the display, wherein
the first application converts the extension of the data, which is stored in a first storage area assigned to the first application, from an original extension into an intermediate extension that is different from a general extension, and
the selected second application stores the data in a second storage area assigned to the selected second application, and converts the extension of the stored data into the original extension from the intermediate extension, the selected second application associated with the intermediate extension.

2. The terminal device according to claim 1, wherein the second application converts the data from the intermediate extension into the original extension based on the original extension of the data that is determined in advance.

3. The terminal device according to claim 1, wherein
the first application converts the data which from the original extension into the intermediate extension, and then passes the data and original data extension information to the second application, and
the second application converts the data into the original extension from the intermediate extension based on the data and the original data extension information.

4. The terminal device according to claim 1, wherein
the first application converts the data from the original extension into the intermediate extension, and further encodes the data into another format determined in advance, and then passes the data to the second application, and
the second application converts the data into the original extension from the intermediate extension, and further decodes the data from the other format determined in advance.

5. The terminal device according to claim 1, wherein the general extension includes at least one of .doc, .pdf and .jpg.

6. The terminal device according to claim 1, wherein the processing circuitry is further configured to receive the request, via a user input, to pass the data to the other application.

7. The terminal device according to claim 1, wherein the processing circuitry is further configured to receive a selection, via a user input, the selection identifying the selected second application.

8. A non-transitory computer-readable recording medium storing a program that causes a computer to execute a process, the process comprising:
executing a first application capable of passing the data to another application;
executing a plurality of second applications;
storing an extension of data that is associated with each of the plurality of second applications;
controlling a display to display a list of applications capable of processing the data associated with the extension, from among the plurality of second applications, in response to a request from a user to pass the data to the other application;
receiving the data from the first application and passing the data to a second application selected from the list of the applications displayed by the display;
controlling the first application to convert the extension of the data, which is stored in a first storage area assigned to the first application, from an original extension into an intermediate extension that is different from a general extension; and controlling the selected second application to store the data in a second storage area assigned to the selected second application, and convert the extension of the stored data into the original extension from the intermediate extension, the selected second application associated with the intermediate extension.

9. The non-transitory computer-readable medium according to claim 8, wherein the converting by the second application includes converting the data from the intermediate extension into the original extension based on the original extension of the data that is determined in advance.

10. The non-transitory computer-readable medium according to claim 8, wherein the converting by the first application includes converting the data from the original extension into the intermediate extension, and then passing the data and original data extension information to the second application, and the converting by the second application includes converting the data into the original extension from the intermediate extension based on the data and the original data type information.

11. The non-transitory computer-readable medium according to claim 8, wherein the converting by the first application includes converting the data from the original extension into the intermediate extension, and further encoding the data into another format determined in advance, and then passing the data to the second application, and the converting by the second application includes converting the data into the original extension from the intermediate extension, and further decoding the data from the other format determined in advance.

12. The non-transitory computer-readable medium according to claim 8, wherein the general extension includes at least one of .doc, .pdf and .jpg.

13. The non-transitory computer-readable medium according to claim 8, wherein the process further includes receiving the request, via a user input, to pass the data to the other application.

14. A data passing method, comprising:

executing, by processing circuitry of a terminal device, a first application capable of passing the data to another application;

executing a plurality of second applications;

storing an extension of data that is associated with each of the plurality of second applications;

controlling a display to display a list of applications capable of processing the data associated with the extension, from among the plurality of second applications, in response to a request from a user to pass the data to the other application;

receiving, by the processing circuitry, the data from the first application and passing the data to a second application selected from the list of the applications displayed by the display;

controlling, by the processing circuitry, the first application to convert the extension of the data, which is stored in a first storage area assigned to the first application, from an original extension into an intermediate extension that is different from a general extension; and controlling, by the processing circuitry, the selected second application to store the data in a second storage area assigned to the selected second application, and convert the extension of the stored data into the original extension from the intermediate extension, the selected second application associated with the intermediate extension.

15. The data passing method according to claim 14, wherein the converting by the second application includes converting the data from the intermediate extension into the original extension based on the original extension of the data that is determined in advance.

16. The data passing method according to claim 14, wherein the converting by the first application includes converting the data from the original extension into the intermediate extension, and then passing the data and original data extension information to the second application, and the converting by the second application includes converting the data into the original extension from intermediate extension based on the data and the original data type information.

17. The data passing method according to claim 14, wherein the converting by the first application includes converting the data from the original extension into the intermediate extension, and further encoding the data into another format determined in advance, and then passing the data to the second application, and the converting by the second application includes converting the data into the original extension from the intermediate extension, and further decoding the data from the other format determined in advance.

18. The data passing method according to claim 14, wherein the general extension includes at least one of .doc, .pdf and .jpg.

19. The data passing method according to claim 14, further comprising receiving the request, via a user input, to pass the data to the other application.

20. The data passing method according to claim 14, further comprising receiving a selection, via a user input, the selection identifying the selected second application.

* * * * *